(12) United States Patent
Yu

(10) Patent No.: US 10,092,882 B2
(45) Date of Patent: Oct. 9, 2018

(54) ULTRATHIN, GRAPHENE-BASED MEMBRANES FOR WATER TREATMENT AND METHODS OF THEIR FORMATION AND USE

(71) Applicant: University of South Carolina, Columbia, SC (US)

(72) Inventor: Miao Yu, Pittsford, NY (US)

(73) Assignee: University of South Carolina, Columbia, SC (US)

(*) Notice: Subject to any disclaimer, the term of this patent is extended or adjusted under 35 U.S.C. 154(b) by 33 days.

(21) Appl. No.: 15/103,642

(22) PCT Filed: Dec. 10, 2014

(86) PCT No.: PCT/US2014/069443
§ 371 (c)(1),
(2) Date: Jun. 10, 2016

(87) PCT Pub. No.: WO2015/089130
PCT Pub. Date: Jun. 18, 2015

(65) Prior Publication Data
US 2016/0310908 A1 Oct. 27, 2016

Related U.S. Application Data

(60) Provisional application No. 61/914,011, filed on Dec. 10, 2013.

(51) Int. Cl.
| | |
|---|---|
| *B01D 39/00* | (2006.01) |
| *C02F 1/44* | (2006.01) |
| *B28B 5/00* | (2006.01) |
| *B01D 39/14* | (2006.01) |
| *B01D 71/02* | (2006.01) |
| *B01D 67/00* | (2006.01) |
| *B01D 69/10* | (2006.01) |
| *B01D 61/02* | (2006.01) |
| *B01D 61/24* | (2006.01) |
| *B01D 69/12* | (2006.01) |
| *C02F 101/32* | (2006.01) |

(52) U.S. Cl.
CPC ......... *B01D 71/024* (2013.01); *B01D 61/027* (2013.01); *B01D 61/243* (2013.01); *B01D 67/0046* (2013.01); *B01D 67/0067* (2013.01); *B01D 67/0069* (2013.01); *B01D 69/10* (2013.01); *B01D 69/125* (2013.01); *B01D 71/021* (2013.01); *C02F 1/44* (2013.01); *C02F 1/442* (2013.01); *B01D 2323/08* (2013.01); *B01D 2323/10* (2013.01); *B01D 2323/34* (2013.01); *B01D 2325/02* (2013.01); *C02F 2101/325* (2013.01)

(58) Field of Classification Search
CPC .... B01D 71/021; B01D 71/024; C01B 32/23; C01B 32/182; B82Y 30/00; B82Y 40/00; Y10S 977/734; Y10S 977/847; Y10T 156/10; Y10T 428/30
See application file for complete search history.

(56) References Cited

U.S. PATENT DOCUMENTS

| | | | | |
|---|---|---|---|---|
| 9,795,931 B2 * | 10/2017 | Yu | ........................ | B01D 71/024 |
| 2012/0021224 A1 * | 1/2012 | Everett | ............. | H01L 21/02491 |
| | | | | 428/408 |
| 2012/0068152 A1 * | 3/2012 | Hwang | ............. | H01L 29/78684 |
| | | | | 257/9 |
| 2013/0314844 A1 | 11/2013 | Chen | | |
| 2014/0022700 A1 * | 1/2014 | Zhao | ................... | H01M 4/0428 |
| | | | | 361/502 |
| 2014/0069443 A1 * | 3/2014 | Johnson | .................. | A61F 11/08 |
| | | | | 128/864 |
| 2014/0087148 A1 * | 3/2014 | Huang | .................... | B32B 27/08 |
| | | | | 428/189 |
| 2014/0287908 A1 * | 9/2014 | Lee | ..................... | C01B 31/0446 |
| | | | | 502/5 |
| 2015/0185156 A1 * | 7/2015 | Mirkin | .................. | B42D 25/30 |
| | | | | 356/301 |
| 2016/0059189 A1 * | 3/2016 | Yu | ........................ | C01B 31/043 |
| | | | | 210/653 |
| 2016/0310908 A1 * | 10/2016 | Yu | ........................ | B01D 71/021 |
| 2017/0014778 A1 * | 1/2017 | Park | ..................... | B01D 53/228 |
| 2017/0106342 A1 * | 4/2017 | Raveendran-Nair | ........................ | |
| | | | | B01D 71/021 |
| 2017/0178824 A1 * | 6/2017 | Kaner | .................... | H01G 11/32 |

FOREIGN PATENT DOCUMENTS

CN 103212304 7/2013

OTHER PUBLICATIONS

Derwent abstract, accNo. 2012-D90703, Week 201267, Pan C. et al. Mar. 21, 2012. (Year: 2012).*
Derwent abstract Acc No. 2016-354485, Derwent week:201662, May 25, 2016, Chen X et al. (Year: 2016).*
Derwent Abstract, acc.No. 2016-628881, Derwent week:201671, Sep. 2, 2016, Ajay et al., (Year: 2016).*
International Search Report dated Jan. 28, 2015.
Li H, Song Z, Zhang X, Huang Y, Li S, Mao Y, Ploehn Hj, Bao Y, Yu M. Ultrathin, molecular-sieving graphene oxide membranes for selective hydrogen separation. Science. Oct. 4, 2013;342(6154):95-8.
Koenig, Steven P., et al. "Selective molecular sieving through porous graphene." Nature nanotechnology 7.11 (2012): 728-732.
Han, Yi, Zhen Xu, and Chao Gao. "Ultrathin graphene nanofiltration membrane for water purification." Advanced Functional Materials 23.29 (2013): 3693-3700.
Bi, Hengchang, et al. "Spongy graphene as a highly efficient and recyclable sorbent for oils and organic solvents." Advanced Functional Materials 22.21 (2012): 4421-4425.
Extended European Search Report dated Jun. 27, 2017.

* cited by examiner

*Primary Examiner* — Ana Fortuna
(74) *Attorney, Agent, or Firm* — Dority & Manning, P.A.

(57) ABSTRACT

Methods are generally provided for forming a membrane. In one embodiment, the method includes: dispersing GO nanoparticles in a solvent; depositing the GO nanoparticles on a support to form a GO membrane; and reducing the GO membrane to form a rGO membrane. Also provided is the rGO membrane formed from such methods, along with a plurality of stacked rGO layers. Methods are also provided for separating water from a water/oil emulsion by, for example, passing water through the rGO membrane.

11 Claims, 4 Drawing Sheets

ULTRATHIN, GRAPHENE-BASED MEMBRANES FOR WATER TREATMENT AND METHODS OF THEIR FORMATION AND USE

PRIORITY INFORMATION

The present application claims priority to U.S. Provisional Patent Application Ser. No. 61/914,011 titled "Ultrathin, Graphene-Based Membranes for Water Treatment and Methods of Their Formation and Use" of Miao Yu filed on Dec. 10, 2013, which is incorporated by reference herein.

FIELD OF INVENTION

The present disclosure is generally directed to methods of forming ultrathin, graphene-based membranes with tunable pore sizes. The resulting ultrathin, graphene-based membranes are particularly suitable for highly efficient water treatment.

BACKGROUND

Clean water is important for many industrial processes and for our daily life. The petroleum industry generates large amounts of wastewaters with high concentrations of oil, including produced water brought to the surface during oil drilling and gas production and refinery wastewater. Produced water accounts for the largest portion of wastewaters in petroleum industry and contains a wide range of contaminants, including salts, heavy metals, oil, suspended solid particles, dissolved organics, and small amount of chemical additives used for drilling, and its composition varies from well to well and from time to time. Depending on its use, produced water needs to be treated at different levels to ensure its reuse and recycling within oil and gas drilling operations, beneficial reuse outside of operations, and surface discharge. However, no matter for onshore disposal or reuse as process water or for off-shore discharge into the sea, essentially almost all oil and grease contaminants in produced water must be removed. Refinery wastewater, which constitutes another large stream of wastewaters, contains hydrocarbons even after conventional wastewater treatment due to its limited biological degradation, and thus also needs further treatment to remove remaining hydrocarbons for discharge or reuse. Hydrocyclones and dissolved air flotation have been used to quickly and effectively remove a large portion of the free oil droplets, but the quality of thus treated water is not high enough for discharge or reuse. Membrane filtration is a highly promising technology to further treat the resultant water with low concentration of oil to obtain almost oil-free water.

Membrane technologies (e.g., ultrafiltration and nanofiltration) widely used in water purification due to their high energy efficiency, low-cost, and simplicity for operation and maintaining. Ultrafiltration membranes with pore sizes from several to 100 nm are appropriate for oil/water separation and have been used to remove essentially all the emulsified oil from oil/water res. Surface property of the membrane materials also plays important role of determining oil/water separation performance. Various materials, such as ceramics ($Al_2O_3$, $ZrO_2$, $TiO_2$, $SiO_2$, etc.), polymer, and carbon nanotubes, have been used to prepare ultrafiltration membranes for oil/water separation; depending on the materials hydrophobicity and hydrophilicity, either oil or water can be extracted from oil/water mixtures. However, it is more practical to use hydrophilic ultrafiltration membranes to selectively extract water from oil to avoid serious membrane fouling problems, as discussed below, because oils are heavier, more viscous and thus are expected to cause fouling quickly.

An ideal membrane for oil/water separation would have i) high water flux, ii) high rejection for oil, iii) long-term stability of flux and rejection, iv) excellent mechanical, chemical and thermal stability, v) ease of processing into large-scale membranes and modules, and vi) low-cost. Currently, long-term membrane stability or membrane fouling is a serious problem for many commercial ultrafiltration membranes and inhibits their wide application for oil/water separation; they usually experience substantial irreversible flux decrease when exposed to oil/water emulsion. Two types of membrane fouling usually occur in ultrafiltration: surface and internal. Surface fouling results from the deposition of contaminants on the membrane surface, and high speed surface flushing may remove surface contaminants and recover membrane performance. Internal fouling is caused by penetration of particulates into the membrane interior and thus pore blocking; penetrated particulates are difficult to be removed and typically lead to permanent membrane performance loss. With current ultrafiltration membrane materials and configuration (three dimensional pore structures and relatively thick membrane thickness), membrane fouling seems difficult to be solved.

Mixture separation using membrane technology can greatly reduce energy cost in industrial processes. The core of this technology is the highly selective membranes with high flux. Graphene, a single layer of graphite, has been considered as an ideal membrane material because it is extremely thin and thus can provide high permeation flux. However, currently there are no technologies available to fabricate ultrathin (<5 nm), graphene-based membranes that can highly selectively separate mixtures.

SUMMARY

Objects and advantages of the invention will be set forth in part in the following description, or may be obvious from the description, or may be learned through practice of the invention.

Methods are generally provided for forming a membrane. In one embodiment, the method includes: dispersing GO nanoparticles in a solvent; depositing the GO nanoparticles on a support to form a GO membrane; and reducing the GO membrane to form a rGO membrane. Also provided is the rGO membrane formed from such methods, along with a plurality of stacked rGO layers. Methods are also provided for separating water from a water/oil emulsion by, for example, passing water through the rGO membrane.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

DEFINITIONS

Figure 1:
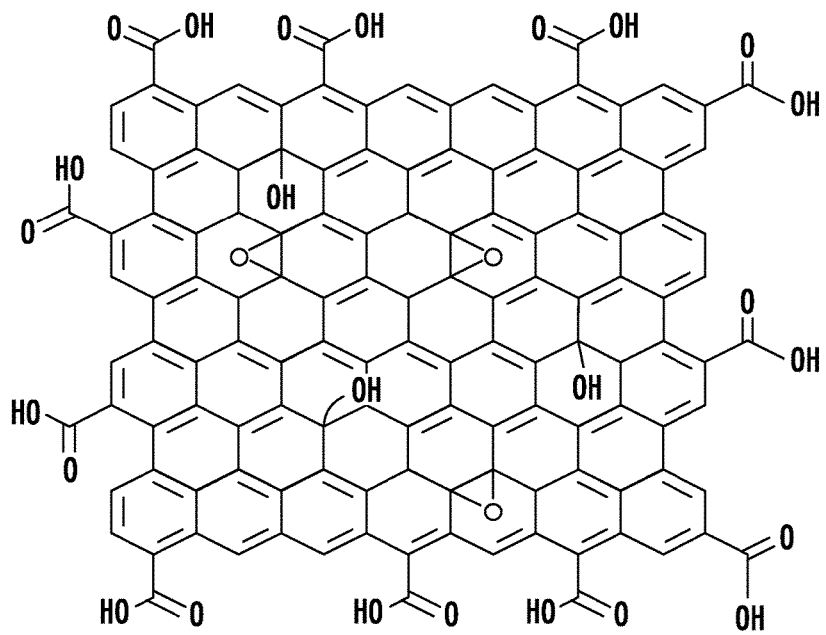
FIG. 1 shows an exemplary chemical structural model of a graphene sheet derivatized by phenyl epoxide and hydroxyl groups on the basal plan and carboxylic acid groups on the edges.

As used herein, the prefix "nano" refers to the nanometer scale (e.g., from about 1 nm to about 100 nm). For example, particles having an average diameter on the nanometer scale from about 1 nm to about 100 nm) are referred to as "nanoparticles".

The term "organic" is used herein to refer to a class of chemical compounds that are comprised of carbon atoms. For example, an "organic polymer" is a polymer that includes carbon atoms in the polymer backbone, but may also include other atoms either in the polymer backbone and/or in side chains extending from the polymer backbone (e.g., oxygen, nitrogen, sulfur, etc.).

As used herein, the term "substantially free" means no more than an insignificant trace amount present and encompasses completely free (e.g., 0 molar % up to about 0.01 molar %).

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

A scalable filtration technique is generally provided to prepare low-cost, ultrathin (e.g., down to about 2 nm) and substantially defect-free, graphene-based membranes with tunable pore sizes (e.g., ranging from about 0.3 nm to about 20 nm). Such membranes have the great potential to revolutionize separation using membrane technology, since they can provide both high selectivity and high flux.

Such ultrathin, graphene-based membranes with tunable pore sizes can be prepared by combining a scalable filtration technique with appropriate etching techniques and have the great potential for highly efficient water treatment, such as desalination, water/oil separation, and nanofiltration for water purification. These membranes have the great potential to revolutionize separation using membrane technology because they can provide both high selectivity and high flux. In one example, layered graphene oxide ("GO") membranes on polymer support separated water from water/oil emulsion with 2 orders of magnitude higher water flux than the support; more importantly, GO membranes showed excellent anti-fouling performance and water flux can be easily recovered by surface flushing. In another example, reduced GO have been shown to have high rejection for 3-nm gold nanoparticles, indicating <3 nm pores. UV-induced oxidation and steam etching can be used to etch graphene nanoflakes to controllably increase structural defects sizes and generate desired pore sizes for target separations. Tunable pore sizes, from <0.4 nm (original structural defects on graphene) to ~10 nm, and ultrathin thickness (<5 nm), allow ultrathin, graphene-based membranes for widespread water treatment, from oil/water separation, desalination, to nanofiltration for water purification. Graphene-based membranes can potentially be used for medical applications too, such as dialysis.

I. Formation of the Membrane

UV-induced oxidation and steam etching can be used to controllably etch graphene nanoflakes to controllably increase structural defects sizes and generate desired pore sizes for targeted separations. Tunable pore sizes, from less than about 0.4 nm (structural defects on graphene) to greater than about 10 nm (e.g., about 0.3 nm to about 20 nm, such as about 0.4 nm to about 10 nm), and ultrathin thickness (e.g., less than about 5 nm (e.g., about 2 nm to about 5 nm), allow the ultrathin, graphene-based membranes to have widespread separation applications: from separation of small gas molecules ($H_2$ separation, $CO_2$ capture, etc.), desalination and nanofiltration for water purification, to medical applications, such as dialysis.

In one embodiment, single-layered graphene oxide (SLGO) powder (e.g., prepared by the Modified Hummer's Method) can be utilized as the raw material for membrane preparation. Such a SLGO powder may be fabricated or purchased commercially. The SLGO powder can be first dissolved into water (e.g., deionized water and then sonicated to ensure dispersion of the SLGO powder in the water. Then, the dispersed SLGO powder can be centrifuged to remove any large particles/aggregates in the dispersion. Finally, the SLGO dispersion can be filtered via vacuum filtration (e.g., Millipore filtration system) through anodic aluminum oxide (AAO) filters with 20-nm pores (e.g., Whatman) or isopore cellulous acetate with 100-nm pores (e.g., Millipore). To roughly control the GO membrane thickness, we calculated the effective filtration area and added the known amount of GO in its 25-ml dispersion for filtration, assuming the membrane density is similar to that of graphite (~2.1 g/cm$^3$). The resulting GO membranes can then be stored in a vacuum desiccator (e.g., Nalgene) for a sufficient time (e.g., >15 hours) to remove the residue water.

In one example, structural defects on graphene oxide or graphene nanoflakes can be utilized to highly selectively separate $H_2$ from other components ($CO_2$, $N_2$ and $CH_4$). See e.g., U.S. Provisional Patent Application Ser. No. 61/850, 415 titled "Ultrathin, Molecular-Sieving Graphene Oxide Membranes for Separations" of Miao Yu filed on Feb. 14, 2013, which is incorporated by reference herein.

II. Separation of Oil and Water

According to one particular embodiment of the present invention, graphene oxide membranes are utilized to separate water from a water/oil emulsion/mixture. Through the use of the graphene oxide membrane, separation of water from a water/oil emulsion can be achieved with more than one order of magnitude higher water flux than conventional membranes.

Graphene-based material is a very promising membrane material because of its atomic thickness, excellent mechanical strength, and high chemical stability. Unimpeded water permeation through 1-μm thick GO membranes was found; water vapor permeated through the GO membranes at the same rate as its evaporation rate in an open vial, resulting from the low-friction flow of a monolayer of water through two-dimensional spacing between closely packed GO sheets. High rejection (>99%) of organic dye molecules was found for these membranes, suggesting nanometer-sized spacing between GO nanoflakes. GO has long been considered as a hydrophilic material because it can be easily dispersed in water, resulting from the ionizable edge-COOH group (FIG. 1).

The development of novel, ultrathin (e.g., less than 5 nm in thickness) membranes composed of GO nanoflakes are generally provided to achieve highly efficient (high water flux and high selectivity) and fouling resistant oil/water separation. The ultrathin GO membranes have the great potential of becoming a new generation of ultrafiltration membranes for oil/water separation, because of the following potential advantages:
  i) High selectivity for water resulting from the hydrophilic water entrance at the edge of the GO flakes;
  ii) High water flux resulting from the ultrathin membrane thickness and low-friction water flow through two-dimensional spacing between GO flakes;
  iii) Excellent resistance to membrane fouling, especially internal fouling, due to the nanometer-sized spacing during water permeation and hydrophilic membrane entrance;
  iv) Excellent scalability of the GO membrane fabrication process; and
  v) Low cost of membrane material resulting from ultrathin membrane thickness.

Figure 2:
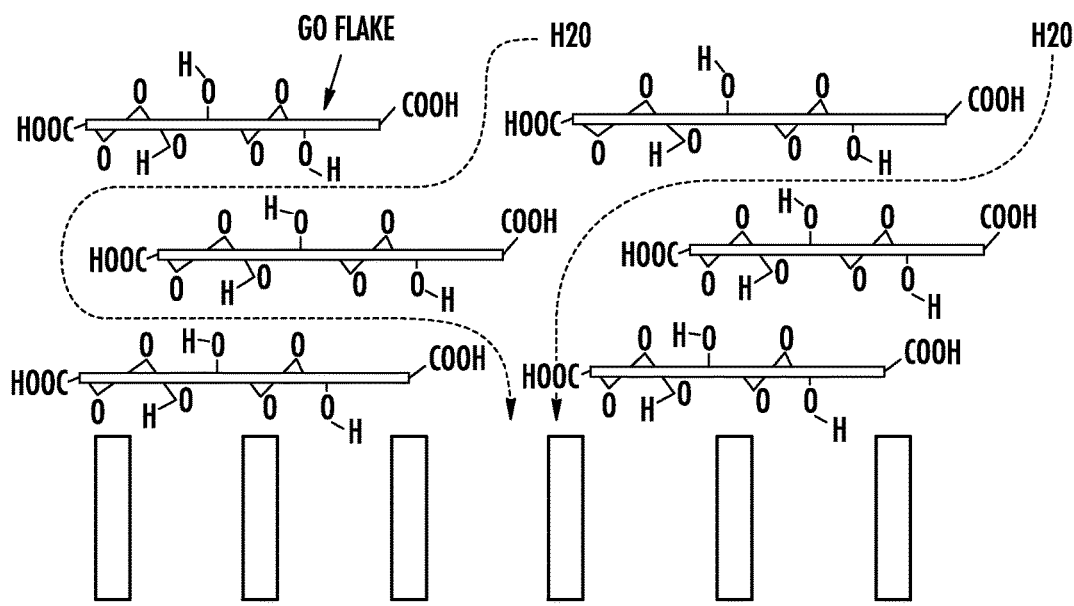
FIG. 2 shows a cross-sectional schematic view of water permeation through an exemplary ultrathin GO membrane.

The novel membrane building blocks, GO nanoflakes with appropriate surface properties, together with the ultrathin, layered membrane structure would lead to significantly improved separation efficiency for oil/water mixture and excellent fouling resistance. Ultrathin GO membranes, as shown in FIG. 2, would allow rapid water permeation and thus high water flux. If high quality, ultrathin GO membranes can be successfully fabricated, they may represent a completely new type of high efficiency thigh water flux and high selectivity), fouling resistant oil/water separation membranes with novel 2-D structure. In addition, GO material cost is expected to be low due to the ultrathin thickness and thus negligible amount of material.

III. Extraction of Organic Compounds from Water

In one particular embodiment, reduced. GO ("rGO") have been shown to be impermeable to water and highly permeable to organic compounds; therefore, organics extraction from water is can be achieved using reduced GO membranes.

Reduced GO membranes can be formed by a number of methods. Methods of reducing graphene oxide to produce reduced graphene oxide are all generally methods based on chemical, thermal or electrochemical means. Some of these techniques are able to produce very high quality rGO, similar to pristine graphene, but can be complex or time consuming to carry out.

The GO membranes can be formed by reducing the GO after, in one particular embodiment, formation of the GO membrane. In one embodiment, the GO membrane can be reduced using hydrogen. For example, the GO can be reacted with Hydrogen (e.g., $H_2$ gas or a mixture of $H_2$ gas and a carrier gas (e.g., Ar or other inert gas)) at an elevated temperature (e.g., about 150° C. to about 240° C., such as about 175° C. to about 225° C.) to form rGO. Alternatively, the GO can be exposed to hydrogen plasma for a sufficient time to reduce the GO. In yet another alternative, GO can be reduced by heating to a reducing temperature (e.g., about 200° C. to about 250° C., such as about 200° C. to about 225° C.) the GO in a vacuum (e.g., about 1 torr to about 5 torr).

After formation of the rGO membranes, the pore size of the rGO membranes can be tuned by UV irradiation (e.g., irradiation with electromagnetic radiation having a wavelength of about 400 nm to about 10 nm), which in turn can control the water permeability of the rGO membrane.

Without wishing to be bound by any particular theory, it is believed that the reducing reaction changes adjacent hydroxyl group (—OH) on the surface of the GO membrane to an ether group (—O—) with a single oxygen bonded to two different carbon atoms on the surface of the GO membrane. This reducing reaction is really a dehydration reaction, since water is removed from the surface (i.e., 2(—OH)→(—O—)+$H_2O$). When hydroxyl groups are present on the surface, then water can penetrate through stacked layers and cause swelling therebetween (likely due to the hydrophilic hydroxyl groups). Conversely, when ether groups are present on the surface without a significant number of hydroxyl groups, then water cannot penetrate through stacked layers and no swelling occurs therebetween (likely due to the hydrophobic ether groups).

EXAMPLES

Figure 3A:
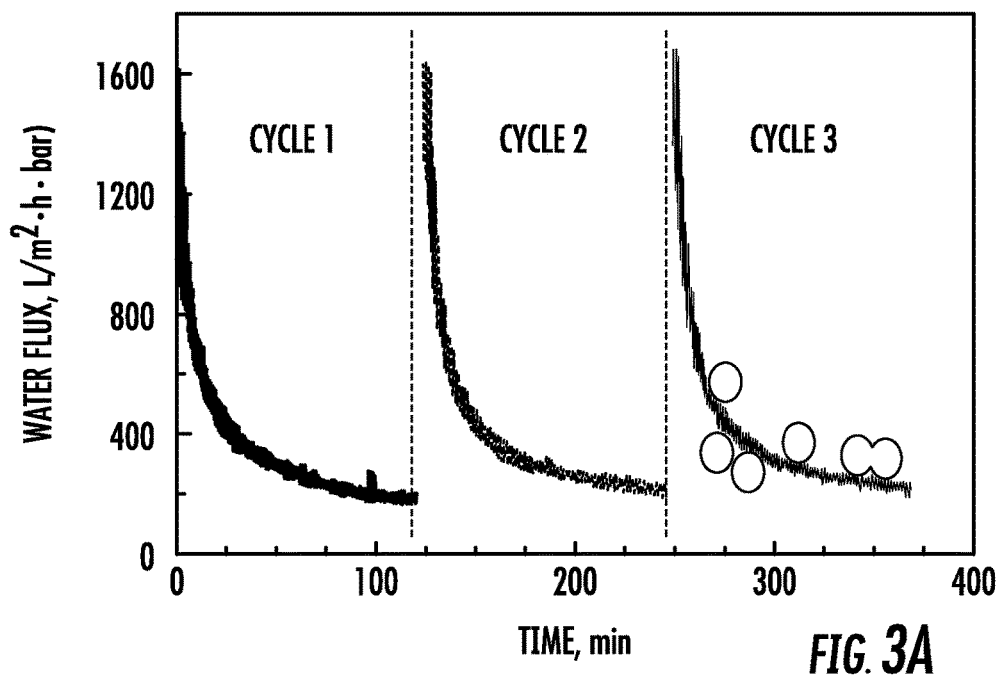
FIG. 3A shows a cyclic oil emulsion separation using a 15 nm GO membrane on polyamide support.

We prepared 15-nm thick GO membranes on polyamide porous support (200-nm pores) using a facile filtration process and measured oil emulsion separation and pure water permeation. 1500 ppm octane in water emulsion, stabilized by surfactant sodium dodecyl sulfate (SDS), was prepared by mixing octane and SDS (mass ratio: 15:1) with water and then sonicating for 2-4 h. The average oil droplet size before filtration (feed) is approximately 10-20 μm, with occasional larger droplets of ~50 μm; after filtration, we did not find oil droplets in the filtrate, indicating excellent oil removal performance of the membrane. A digital picture shows much cleaner water after filtration. We conducted pressure-driven, cyclic oil emulsion separation using a static, dead-end filtration cell; between each cycle, DI water was used to flush GO membrane surface or polyamide support surface for 1 min. FIG. 3A showed that for the 15-nm GO membrane, water flux decreased from approximately 1600 to 400 L/($m^2$·h·bar) in the beginning 25 min and then gradually decreased to 200 L/($m^2$·h·bar) from 25 to 120 min.

Figure 3B:
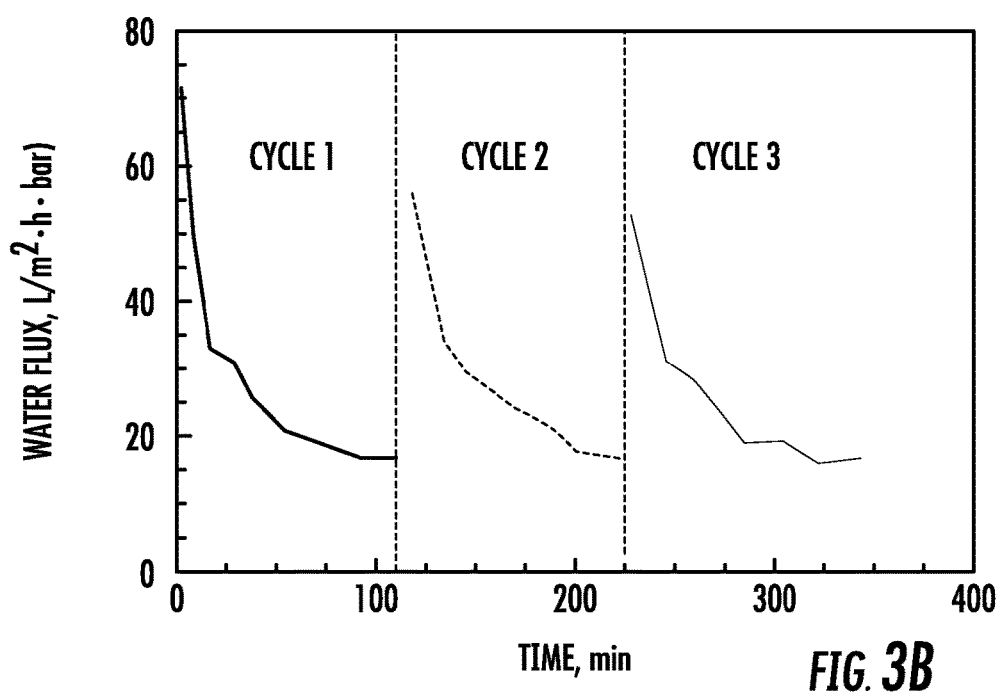
FIG. 3B shows a cyclic oil emulsion separation using a blank polyamide support.
Figure 4:
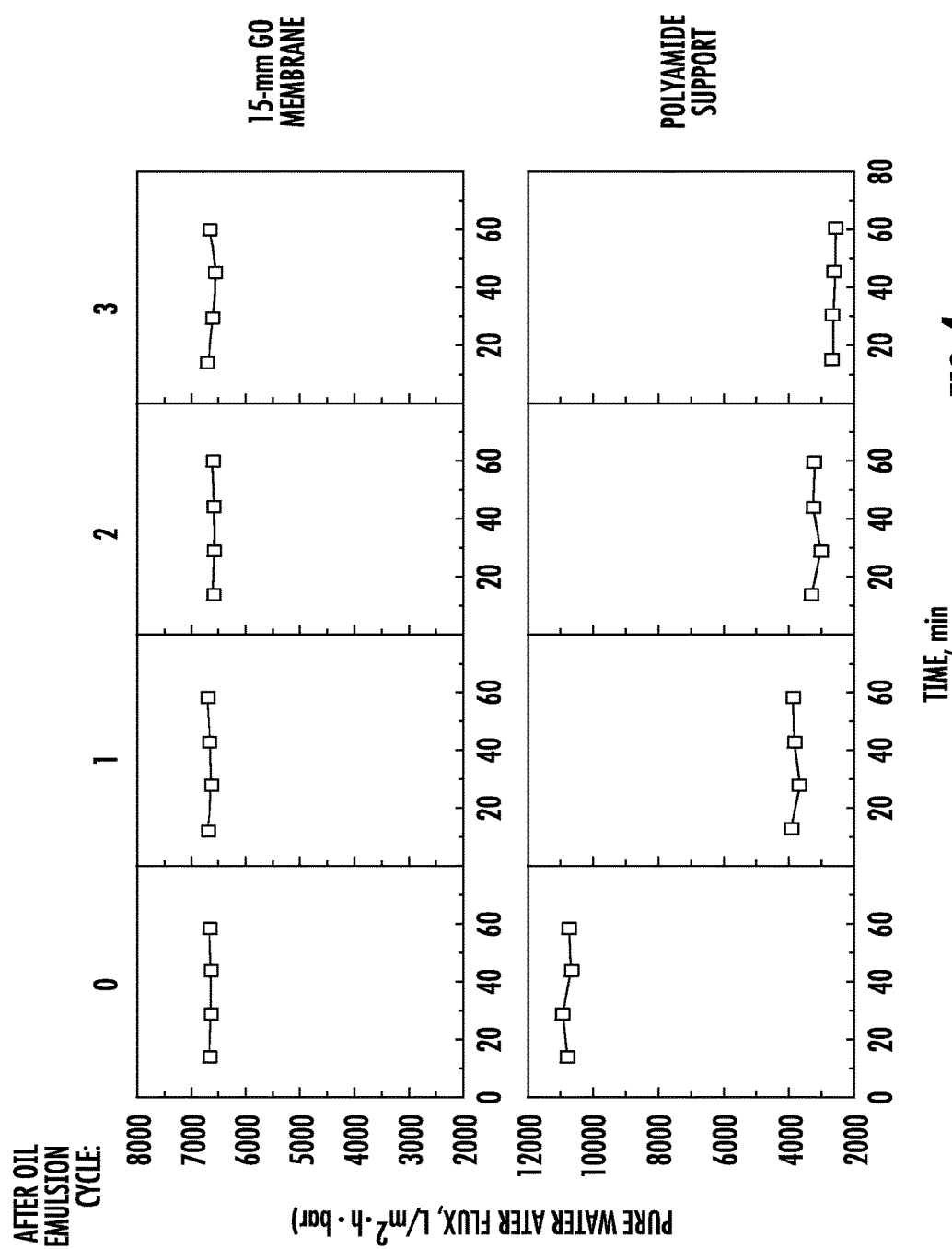
FIG. 4 shows pure water flux before (cycle 0) and after different oil emulsion separation cycles (1, 2, and 3) for a 15 nm GO membrane on polyamide support (top) and for a blank polyamide support (bottom).

The initial fast decrease may be due to the adsorption of oil droplets on GO membranes surface and gradual decrease may result from the oil accumulation on the membrane surface due to the static, dead-end operation system. After DI water flushing, initial water fluxes in the 2nd and 3rd runs were almost the same as that in the 1st run and also decreased similarly as in the 1st run, suggesting complete recovery of GO membrane's oil/water separation performance. This indicates GO membrane's strong fouling resistance, especially internal fouling. In contrast, a blank polyamide support showed severe fouling when separating octane emulsion (FIG. 3B); Initial water flux in the 1st run was only 72 L/($m^2$·h·bar), approximately 22 times lower than the 15-nm GO membrane on the polyamide support; after 110 min running, water flux decreased to 17 L/(m²·h·bar), more than 10 times lower than that of GO membrane after 120 min running. After water flushing, initial water flux was only partially recovered and kept decreasing with the increase of the cycle numbers; initial water fluxes in the 2nd and 3rd cycles were 78% and 73% of that in the 1st run, respectively. Therefore, there was a severe membrane fouling, especially internal fouling, exist for the polyamide support, and the membrane performance cannot be completely recovered by surface flushing. The total collected water volume in about 2-h oil emulsion separation using the supported GO membrane was 360 ml, while it was only 26 ml using the polyamide support. We also measured pure water flux of the GO membrane and the polyamide support before and after different oil emulsion separation cycles, as shown in FIG. 4. Pure water flux through a clean polyamide support (cycle 0) was approximately 11,000 L/(m²·h·bar), while that of 15-nm GO membrane on a polyamide support was ~6,600 L/(m²·h·bar). After the 1st oil emulsion separation cycle, pure water flux through the polyamide support decreased to 3,800, 3,200, and 2,550 L/(m²·h·bar) after the 1st, 2nd, and 3rd oil emulsion separation cycles, respectively. In strong contrast, the 15-nm GO membrane did not show any pure water flux decrease after 3 cycles. This further supports our conclusion that no obvious fouling, especially internal fouling, occurred for GO membranes. These results indicate great potential of using GO membranes for antifouling oil emulsion separation.

Nanoparticle Rejection

Single-layered GO (SLGO) nanoflakes were utilized to prepare ultrathin (1.8~18 nm) GO membranes. Ultrathin GO membranes were prepared on anodic aluminum oxide (AAO) porous supports (20 nm pores) by filtration and measured pure gas permeation and $H_2$ mixture separation. It was found that $H_2$ permeated preferentially through small structural defects on GO flakes and selectivities of $H_2/CO_2$ and $H_2/N_2$ mixtures were as high as 3400 and 900, respectively. This indicates ultrathin GO membranes, prepared by facile filtration, have high quality and effective membrane pore size is smaller than $CO_2$ (kinetic diameter: 0.33 nm) and $N_2$ (0.364 nm) molecules. Therefore, structural defects on GO flakes are expected to reject hydrated monovalent ions (~0.6 nm).

Figure 5A:
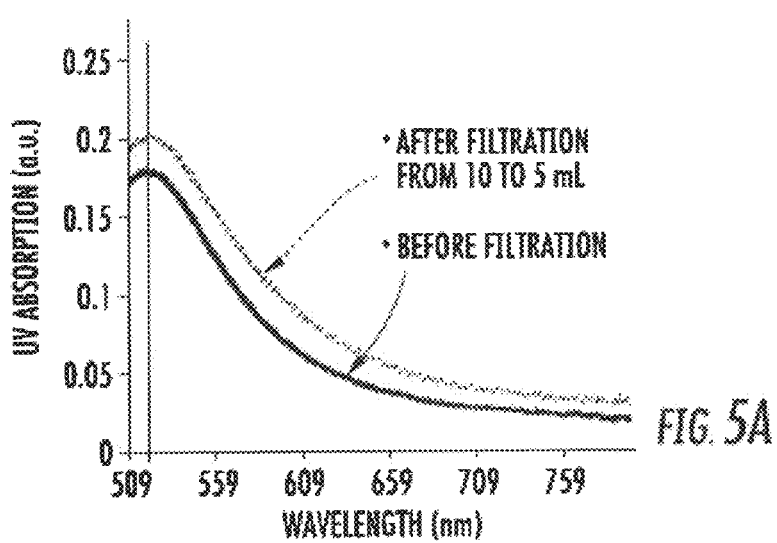
FIG. 5A shows gold nanoparticle (3 nm) rejection by an AAO support
Figure 5B:
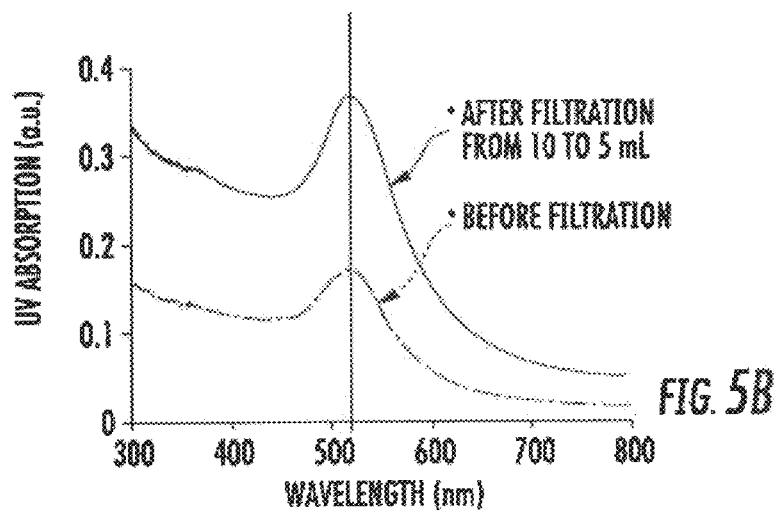
FIG. 5B shows gold nanoparticle (3 nm) rejection by a 2 nm membrane vacuum reduced.
Figure 5C:
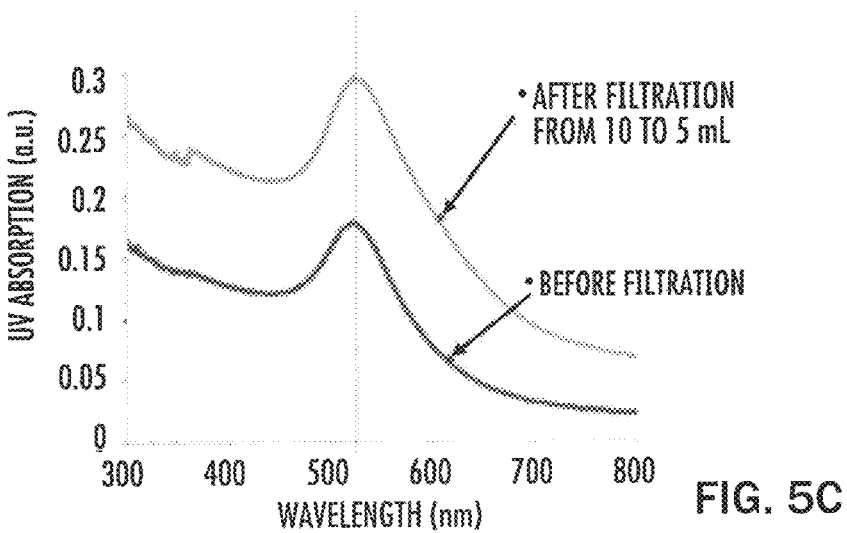
FIG. 5C shows gold nanoparticle (3 nm) rejection by a 2 nm membrane $H_2$ reduced.

GO membranes, however, have been shown to swell upon adsorption of water molecules and interlayer spacing can increase from ~0.4 nm to 1~2 nm, while reduced GO (rGO) will not be swelled by water due to its high hydrophobicity. Therefore, water can permeate through GO membranes easily, whereas reduced GO (rGO) membranes have negligible water flux. High quality ultrathin rGO membranes without water permeation between nanoflakes, therefore, are ideal starting membranes for subsequent pore size tuning by appropriate etching techniques, such as steaming etching or UV-induced oxidation. We thermally reduced GO membranes at 220° C. for 10-20 h in a vacuum oven or at 200° C. for 2 h in 1% $H_2$/99% Ar gas mixture to obtain rGO membranes. 2-nm GO on AAO had obvious effects on water permeation through AAO and reduced water permeability by 42%. This is due to the long water transport pathway between GO flakes; water adsorbs between GO nanosheets and swells the membranes, as suggested by water vapor permeation results and XRD results. After vacuum reduction water permeability decreased to 0.05 L/(cm²·day·MPa) approximately 600 times lower than GO membranes, while after $H_2$ reduction water permeability was as high as 17 (cm²·day·MPa). This seems to suggest $H_2$ reduction generates larger defects on GO membranes. In order to identify pore sizes of rGO membranes, we did gold nanoparticle (3 nm) filtration and monitored feed composition change, as shown in FIG. 5A, 5B, 5C. Blank AAO support showed low rejection for gold particles, ~1.0% (FIG. 5A). Vacuum reduced, 2-nm rGO membrane showed almost 100% rejection for gold particles (FIG. 5B), while $H_2$ reduced membrane showed 90% rejection for 3-nm gold particles (FIG. 5C). This is consistent with water permeation results and indicates that $H_2$ reduction indeed enlarged pore sizes on GO. Therefore, Vacuum reduction seems to be a better way to minimize the effects of reduction on changing pore sizes of GO.

We also used UV irradiation to etch rGO membranes in air for 10 min and found that water permeability increased to ~10 L/(cm²·day·MPa). This strongly suggests that UV irradiation is an effective way of etching ultrathin graphene membranes to generate nanopores and adjusting etching time may potentially tune the nanopore sizes to achieve desired size rejection. These results indicate that i) ultrathin (~2 nm), defect-free rGO membranes with negligible water permeation can be prepared by a scalable filtration process and appropriate thermal reduction and ii) UV etching may be used to open pores on graphene nanosheets to increase water permeation rate.

CONCLUSIONS

Mixture separation using membrane technology can greatly reduce energy cost in industrial processes. The core of this technology is the highly selective membranes with high flux. Graphene, a single layer of graphite, has been considered as an ideal membrane material because it is extremely thin and thus can provide high permeation flux. However, currently there are no technologies available to fabricate ultrathin (<5 nm), graphene-based membranes that can highly selectively separate mixtures. A scalable filtration technique was developed in this invention to prepare low-cost, ultrathin (down to 2 nm) and defect-free, graphene-based membranes with tunable pore sizes (0.3-20 nm). This completely new type of membranes has the great potential to revolutionize separation using membrane technology, because they can provide both high selectivity and high flux.

Selectivity and flux are two important parameters for evaluating separation performance when applying membrane technology. In an ideal situation, we expect to maximize both flux and selectivity to minimize capital cost and energy cost during operation. In order to achieve the goal, membrane thickness needs to be minimized to maximize flux and the pore size needs to be accurately controlled and be uniform to only allow smaller molecules to pass through. Current membranes are too thick (>50 nm) and have relatively wide pore size distribution. Ultrathin (<5 nm), graphene-based membranes/nanomeshes with tunable pore sizes (0.3->10 nm) have the great potential to be the ideal membranes for separations. Ultrathin, graphene-based membranes/nanomeshes with tunable pore sizes can separate target mixtures with both high selectivity and high flux, resulting from their accurately controlled pore sizes and ultrathin thickness. The potential separation applications are expected to be wide, from desalination and nanofiltration for water purification, to medical applications, such as dialysis.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of forming a membrane, the method comprising:
    dispersing single-layered graphene oxide powder in deionized water to form a single-layered graphene oxide dispersion;
    sonicating the dispersion;
    centrifuging the dispersion to remove large particles and aggregates from the dispersion;
    thereafter, filtering the dispersion through a porous support such that a graphene oxide membrane of layered graphene oxide nanoflakes is formed on the support, the graphene oxide membrane having a thickness of about 2 nm to about 5 nm;
    thereafter, reducing the graphene oxide membrane to form a reduced graphene oxide membrane wherein reducing the graphene oxide membrane comprises heating the graphene oxide membrane to a reducing temperature of about 200° C. to about 250° C. in a vacuum of about 1 torr to about 5 torr, or comprises heating the graphene oxide membrane to a reducing temperature of about 150° C. to about 240° C. in the presence of hydrogen, or comprises exposure of the graphene oxide membrane to hydrogen plasma; and
    thereafter, etching the reduced graphene oxide membrane with electromagnetic radiation having a wavelength of about 400 nm to about 10 nm or with steam to generate pores of a predetermined size in the reduced graphene oxide membrane.

2. The method of claim 1, wherein the support comprises aluminum oxide.

3. The method of claim 1, wherein the support comprises an anodic aluminum oxide porous support.

4. The method of claim 1, wherein the support defines pores having an average size of about 0.3 nm to about 20 nm.

5. The reduced graphene oxide membrane formed from the method of claim 1.

6. A method of separating water from a water/oil emulsion, the method comprising passing water through the reduced graphene oxide membrane of claim 5.

7. The method of claim 1, wherein the porous support is a polymer support.

8. The method of claim 7, wherein the polymer is a polyamide.

9. The method of claim 7, wherein the polymer is a cellulose acetate.

10. The method of claim 1, wherein the predetermined size of the pores of the reduced graphene oxide membrane is from about 0.3 nm to about 20 nm.

11. The method of claim 1, wherein the predetermined size of the pores of the reduced graphene oxide membrane is from about 0.4 nm to about 10 nm.

* * * * *